Sept. 1, 1959   R. G. LUCAS   2,901,829
GAUGE FOR PISTON RING GROOVES
Filed Oct. 28, 1957

INVENTOR
RUPERT G. LUCAS.

BY  Frank C Maley
AGENT.

United States Patent Office 2,901,829
Patented Sept. 1, 1959

2,901,829

GAUGE FOR PISTON RING GROOVES

Rupert G. Lucas, Elm City, N.C.

Application October 28, 1957, Serial No. 692,875

2 Claims. (Cl. 33—168)

The present invention relates to gauges and more particularly to feeler gauges for determining the height of a groove, such as the piston ring groove in the head of the piston of an internal combustion engine.

It is an object of the present invention to provide a feeler gauge to determine the height of the piston ring groove in the piston of an internal combustion engine, which gauge is adapted to measure the height of the groove immediately adjacent the back wall of the groove.

It is another object of the present invention to provide a feeler gauge for piston ring grooves formed in the piston of an internal combustion engine wherein the gauge contacts the back wall defining the bottom of the groove over a predetermined arcuate length of the wall so as to measure the vertical height of the groove over a predetermined length.

It is another object of the present invention to provide a feeler gauge for measuring the height of the piston ring grooves in the piston of an internal combustion engine, which gauge comprises a plurality of gauge heads so arranged with respect to one another that they may be rotated in succession into the groove until the first gauge head which is larger than the groove is presented thereto.

The above and still further objects, features and advantages of the present invention will become apparent upon consideration of the following detailed description of one specific embodiment thereof, especially when taken in conjunction with the accompanying drawings, wherein:

Figure 1 of the present invention is a view in vertical cross section of the gauge applied to the piston ring groove formed in the piston of an internal combustion engine;

Figure 1:
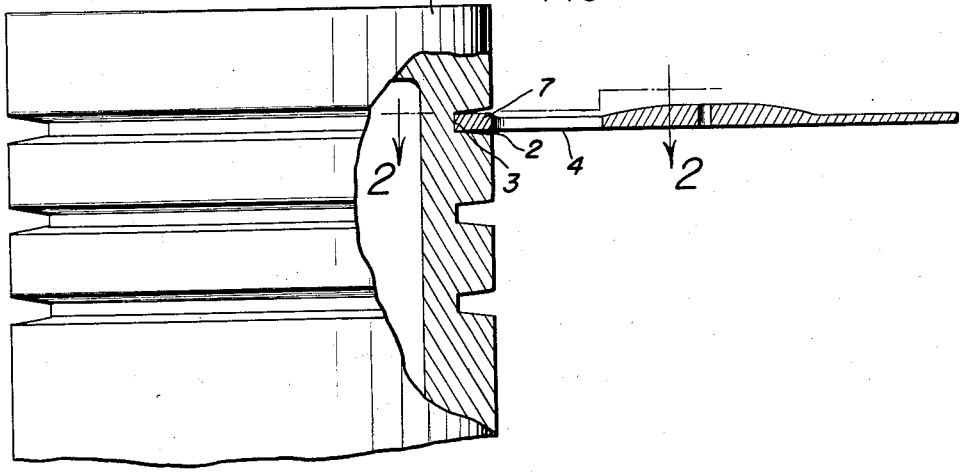

Referring specifically to Figure 1 of the accompanying drawings, there is illustrated a portion of a piston 1 of an internal combustion engine showing a worn piston ring groove 2 subsisting therein. It will be noted that the outer edge of the groove is larger than the inner edge immediately adjacent its back wall 3. It is the purpose of the gauge of the present invention to measure the vertical height of the back wall of the grooves so that the true size of the ring which must be employed therewith may be determined. It is apparent that if the groove were measured immediately adjacent its outer edge, a measurement would be provided across that portion of the groove which takes the major portion of wear and, therefore, is larger than the remaining portion of the groove. In consequence, if the measurement were made at the worn portion of the groove, a ring would be provided which in actuality was too large for the groove, and in all likelihood could not be seated therein.

Figure 2:
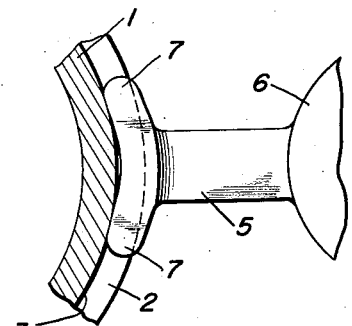
Figure 2 is a cross-sectional view taken along line 2—2 of Figure 1.
Figure 3:
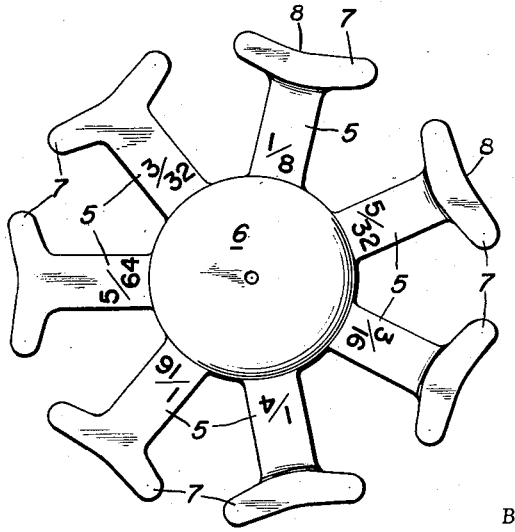
Figure 3 is a plan view of the gauge of the present invention.

The tool of the present invention which is generally designated by the reference numeral 4 is intended to measure the vertical height of the groove immediately adjacent the rear wall thereof and comprises (see Figures 2 and 3) a plurality of arms 5, preferably equally spaced about a center hub 6 and extending radially outward therefrom. Each of the arms terminates in an arcuate gauge head 7, each of which is of a different vertical height and is adapted to be inserted into the piston ring grooves in the piston 1 to determine the vertical height thereof. Each of the gauge heads 7 has an arcuate edge surface 8 remote from the hub 6 which is intended to be of the same radius of curvature as the wall 3 defined by the groove 2 in the piston 1. The gauge heads 7 are carried on the ends of the arms 5 as previously indicated and the arms may be of the same thickness as the gauge head 7 or of a lesser thickness, but should not be of a greater thickness so as to insure that the head 7 may be inserted into the groove 2 sufficiently to contact the wall 3.

As a result of the arcuate configuration of the gauge heads 7 and the utilization of radial arms 5, the gauge measures the vertical height of the groove 2 immediately adjacent the wall 3 and makes the measurement over a predetermined arcuate length of the groove as determined by the arcuate length of the feeler portion of a gauge head 7. It is preferable to take the measurement over a substantial arcuate length so that it is not substantially influenced by a local deformity in the groove 2, but measures a predetermined length of the groove to provide a far more accurate measurement than could be provided were the gauge to measure only a very small arcuate length.

An important feature of the invention is that the bottom surfaces, as viewed in Figure 1, of gauge heads 7, the arms 5 and the hub 6 are coplanar, whereas any surface variations required for producing gauges of various depth occur along the upper walls as seen in Figure 1. Obviously, the members may be coplanar along the top walls, it being necessary that all elements have one surface which is coplanar with the surfaces of all other elements. The utilization of the coplanar surfaces permits the gauge to be placed in the palm of the hand of the user with the smallest gauge head 7 inserted in the groove 2. Thereafter, the gauge may be rotated by simply drawing the hand across the radial spokes so that each of the gauge heads 7 is inserted into the groove 2 in succession. When the first gauge head 7 that is too large for the groove is presented thereto, the gauge will be moved outwardly away from the piston 1 to provide an indication that that head 7 is too large for the groove. Therefore, the next preceding gauge head 7 to that which forced the gauge away from the piston may be read to determine the largest standard ring which will fit in the groove 2.

The ring grooves formed in the piston of internal combustion engines are standard for different models and, therefore, a single gauge may be provided having a sufficient number of arms to include all standard size grooves provided in the more common types or models of automobiles on the market. Therefore, a single gauge may be utilized for all measurements, there being substantially no restriction on the number of gauge heads 7 which may be provided on a single gauge. There is no necessity to know the specific groove sizes utilized in a particular automobile since by merely setting the smallest groove measuring head 7 in the groove the tool may be rapidly rotated until it is forced out of the groove, thereby indicating the largest standard size ring which may be utilized with that particular groove.

With respect to the ability to rotate the gauge, it is the provision of a gauge having one surface of all members aligned which allows the gauge to be rotated since if the surfaces were not coplanar considerable difficulty would be experienced in attempting to maintain the gauge aligned with the groove while rotating the gauge.

It can be seen from the above that the gauge of the present invention precludes the possibility of effecting incorrect readings of the vertical height of a piston ring groove due to wear at the outer edge of the groove simply by insuring that the gauge seats against the back wall of the groove. In addition the possibility of local irregularities in the groove effecting the gauge reading are substantially eliminated by measuring the vertical height of the groove over a relatively large predetermined length immediately adjacent the bottom wall thereof.

Further, the provision of a discontinuous gauging surface which is effected by providing a plurality of radial arms with the gauging heads 7 disposed on the end thereof allows the gauge to be rotated by simply holding the gauge in the palm of the hand and by inserting one of the feelers in the groove and then drawing the palm over the gauge so as to rotate the various portions of the gauge into the groove and, therefore, facilitate the measurement operation.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A feeler gauge comprising a generally circular hub, a plurality of arms extending radially outward of said hub and approximately equally spaced thereabout, a plurality of gauge heads each secured to an outer extremity of a different one of said arms, each of said heads including an arcuate end surface having a radius of curvature approximately equal to the radius of circumferential curvature of the bottom wall of the groove to be measured, each of said heads having a different gauge height, and said hub, said arms, and said gauge heads each having a surface lying in a common plane.

2. A feeler gauge comprising a central hub, a plurality of arms extending radially outward from said hub and equally spaced thereabout, a plurality of feeler heads for measuring the height of a groove, each of said heads being secured to the outer end of a different one of said arms and having an arcuate outer surface conforming to the circumferential curvature of the back wall of the groove to be measured, each of said heads having a gauging height different from the gauging height of the other heads, and said hub, said arms and said head each having a surface lying in a plane common to a surface of each of the other members and each of said arms being of approximately the same thickness.

References Cited in the file of this patent

UNITED STATES PATENTS

| | | |
|---|---|---|
| 1,990,430 | Fitzgerald | Feb. 5, 1935 |
| 2,533,295 | Starbuck | Dec. 12, 1950 |
| 2,580,445 | Longworth | Jan. 1, 1952 |
| 2,664,638 | Storey | Jan. 5, 1954 |